May 15, 1923.
M. L. WARREN
EDUCATIONAL GAME APPARATUS
Filed June 11, 1921
1,455,098
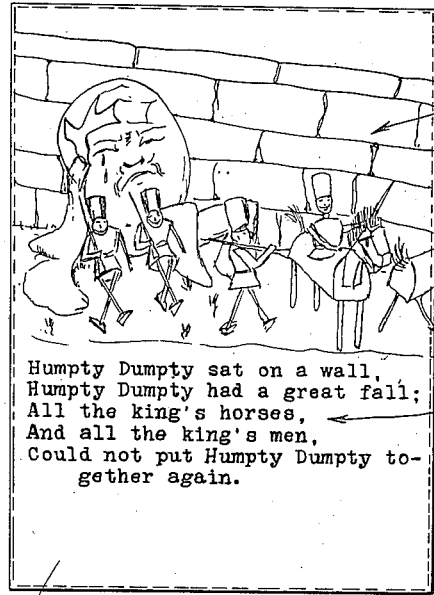
Humpty Dumpty sat on a wall,
Humpty Dumpty had a great fall;
All the king's horses,
And all the king's men,
Could not put Humpty Dumpty together again.
*Fig. 1.*
| | |
|---|---|
| 1 +1 = 2 | 4 +1 = 5 |
| 1 +2 = 3 | 4 +2 = 6 |
| 1 +3 = 4 | 4 +3 = 7 |
| 1 +4 = 5 | 4 +4 = 8 |
| 1 +5 = 6 | 4 +5 = 9 |
| 1 +6 = 7 | 4 +6 = 10 |
| 1 +7 = 8 | |
| 1 +8 = 9 | 5 +1 = 6 |
| 1 +9 = 10 | 5 +2 = 7 |
| | 5 +3 = 8 |
| 2 +1 = 3 | 5 +4 = 9 |
| 2 +2 = 4 | 5 +5 = 10 |
| 2 +3 = 5 | |
| 2 +4 = 6 | 6 +1 = 7 |
| 2 +5 = 7 | 6 +2 = 8 |
| 2 +6 = 8 | 6 +3 = 9 |
| 2 +7 = 9 | 6 +4 = 10 |
| 2 +8 = 10 | |
| | 7 +1 = 8 |
| 3 +1 = 4 | 7 +2 = 9 |
| 3 +2 = 5 | 7 +3 = 10 |
| 3 +3 = 6 | |
| 3 +4 = 7 | 8 +1 = 9 |
| 3 +5 = 8 | 8 +2 = 10 |
| 3 +6 = 9 | |
| 3 +7 = 10 | 9 +1 = 10 |
*Fig. 2.*
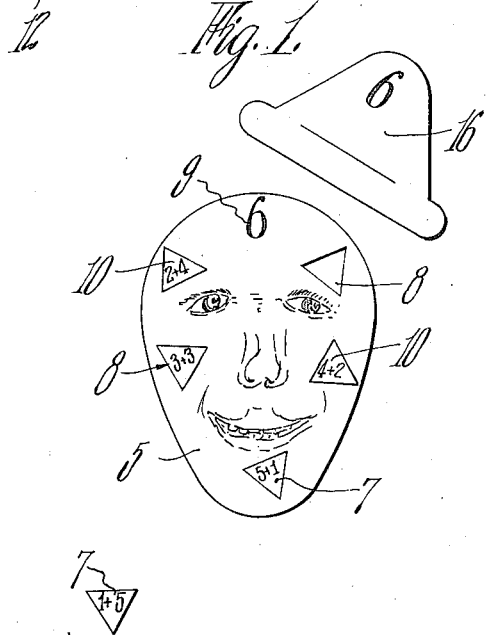
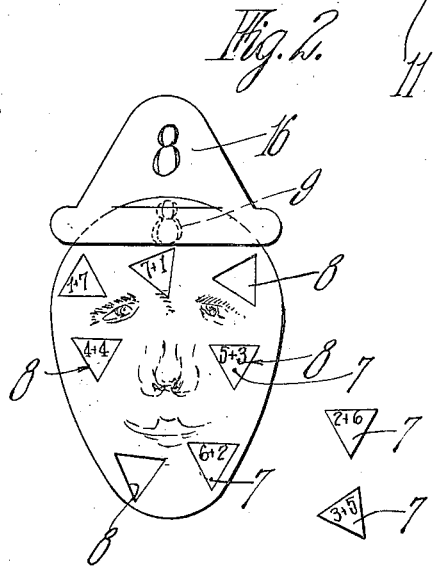
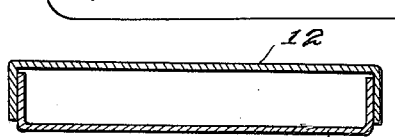
*Fig. 3.*
*Fig. 4.*
INVENTOR
Mildred L. Warren,
BY Chapin & Neal
ATTORNEYS Patented May 15, 1923.

1,455,098

UNITED STATES PATENT OFFICE.

MILDRED L. WARREN, OF SPRINGFIELD, MASSACHUSETTS.

EDUCATIONAL GAME APPARATUS.

Application filed June 11, 1921. Serial No. 476,731.

*To all whom it may concern:*

Be it known that I, MILDRED L. WARREN, citizen of the United States, residing at Springfield, in the county of Hampden and State of Massachusetts, have invented new and useful Improvements in Educational Game Apparatus, of which the following is a specification.

The present invention relates to means in the nature of a game apparatus which is particularly adapted for both entertaining and instructing children. More particularly, the invention relates to an apparatus for use in kindergarten or primary schools to familiarize the pupils with numbers and to develop ability on their part to solve simple problems in addition, subtraction, multiplication and division.

The primary object of the invention is to provide a novel and attractive apparatus, especially adapted to interest and amuse a child by exciting his curiosity and appealing to his imagination and to his natural disposition to play, while at the same time causing him unconsciously to memorize certain facts or attain familiarity with certain arbitrary and basic principles such for example, as the relations of numbers to each other, or to acquire a preliminary understanding of subjects with respect to which a very young child has little natural interest.

With the above and other objects in view, the present invention comprises the features of construction and the combinations and arrangements of parts hereinafter described and particularly pointed out in the appended claims.

The invention, from the standpoint of its solely entertaining or amusing features and in its educational aspect as well, is susceptible of various changes, both in the form and organization of its parts, and in the character of the display matter contained thereon without departing from the essential spirit and scope of the invention or sacrificing any of the advantages thereof.

While the invention is illustrated and will be hereinafter described in its application to apparatus for use in the teaching of numbers or arithmetic, it is to be understood that this is only a preferred embodiment thereof and that the invention is equally well adapted for use in connection with the teaching of other subjects or for other educational purposes. The invention, as a whole, therefore, should be construed broadly and only such limitations imposed as appear in the claims.

The invention will be best understood by reference to the accompanying drawings of the preferred embodiment thereof and to the following description of the construction and arrangement of parts therein shown.

In the drawings,—

Figs. 1 and 2 are plan views of the cover and body portion, respectively, of a shallow box constituting part of a game apparatus constructed in accordance with the present invention and adapted to contain the other portions of the game; and Fig. 3 is a plan view of certain pieces representative of the parts of the game apparatus which are separate from the box.

Fig. 4 is a sectional view of the box.

The illustrative apparatus is in the form of a game embodying, as one of its entertaining and interest-attracting features, an idea suggested by the nursery rhyme of "Humpty Dumpty." This rhyme, universally known to children, portrays the fall of an egg, fancifully personified as Humpty Dumpty, the fall naturally resulting in the breaking of the egg into pieces so that it cannot be restored to its original condition.

In carrying out the present invention, an article, such as a piece of heavy cardboard, is cut into oval form to represent an egg and smaller pieces are cut out of the egg-shaped card, leaving corresponding openings or holes in the card. These cut out pieces may be of regular or irregular shape and obviously may be regarded as fragments of a broken egg shell. The game consists in replacing the pieces or fragments in the openings of the egg-shaped card in which these pieces properly belong. In other words, the game consists in putting "Humpty Dumpty together again." This, from the viewpoint of the child, is an interesting performance and much entertainment may be derived therefrom. A set of these cards may be provided so that the game may be played simultaneously by several players.

The educational or instructive feature of the particular embodiment of the invention shown in the drawings consists in numbering the egg-shaped cards consecutively, from one to nine, and in printing upon the several pieces cut from each card different combinations of numbers the sum of which equals the amount indicated by a numeral or "key" number upon the respective card. Thus, when the child fits a particular piece into a hole in the card bearing a key number equal to the sum of the numbers on said piece, the fact will be forcefully brought to his attention that the two numbers printed upon that piece, if added together, will equal the key number displayed upon that card. Upon fitting into another hole in the same card another piece bearing a different combination of numbers the sum of which equals the same key number, he becomes familiar with the new combination and learns that the sum of the numbers therein is the same as the sum of the numbers of the preceding combination. It is contemplated that there will be as many pieces cut from each card as there are possible combinations of two numbers the sum of which equals the key number displayed upon that particular card. Thus, when all the pieces cut from a single card have been replaced therein, the player's attention has been called to all the possible combinations of numbers the sum of which equals the key number of the card. When all of the pieces have been replaced in all of the cards of the set, all the combinations of two numbers which may be added to produce any number from two to ten will be indicated. The numbers of the various combinations may be so chosen that the difference between them, instead of the sum thereof, will equal the key number of the card, or they may be made such that when one of them is multiplied by the other the product will equal the key number, or when one is divided by the other the key number will be obtained. After a child has played the game a few times, he unconsciously becomes familiar with these combinations of numbers and is therefore capable of performing simple problems in addition, subtraction, multiplication or division, as the case may be.

Referring now to Fig. 3 of the drawings, two of the set of nine egg-shaped cards are indicated at 5 and 6. As shown, each card has printed thereon a pair of eyes, a nose and a mouth, these features being so disposed with respect to the oval outline of the card as to fancifully represent Humpty Dumpty. The smaller pieces cut from the two cards illustrated are indicated by the reference numeral 7, and the openings made by the cutting of the pieces from the cards are indicated by the reference numeral 8. Certain of the pieces 7 are shown disassembled from the cards, while others are assembled in the proper openings 8. While the pieces 7 may be of irregular shapes, it is preferable that all the pieces shall be duplicates so that each piece will properly fit into any one of the many openings 8 in the several cards of the set.

Upon the upper portion of each card, as determined by the arrangement of the facial features thereon, is prominently displayed a numeral, or "key" number, indicated at 9, the nine cards of the set being numbered consecutively, from two to ten. As shown, the two cards chosen for illustrative purposes, are those to which the key numbers 6 and 8, respectively, have been applied. Each piece 7 cut from the card bearing the key number 6 has printed thereon a different combination of numbers the sum of which equals 6, while similarly each piece cut from the card bearing the key number 8 and each of those cut from all the other cards of the set, bears a different combination of numbers which, added together, equal the amount indicated by the key number of the particular card from which the pieces have been cut. Preferably, all the possible combinations of two numbers which, added, produce a sum represented by a particular key number, are represented, there being a separate piece for each of said combinations. For example, in the card designated by the key number 6 (as illustrated in Fig. 3) there are five possible combinations of two numbers the sum of which equals six and consequently five pieces have been cut from that card.

Preferably, the two numbers of each combination are connected by a "plus" sign as indicated at 10 in Fig. 3. For example, the pieces cut from the card above referred to as bearing the key number 6, will have printed thereon the following notations, viz: 1+5; 2+4; 3+3; 4+2; and 5+1, respectively. The card bearing the key number 8, for example, will be provided with seven openings, there being seven possible combinations of two numbers the sum of which equals eight. All of the pieces 7, bearing the different combinations of numbers, being duplicates in shape are consequently interchangeable, and since it is possible to fit any of these pieces in any of the openings 8, the players will be guided only by the numerical notations upon the pieces as a means for determining the proper card with which to assemble any particular piece. Thus these notations or combinations of numbers and the sums thereof will be impressed upon the player's mind, and he will unconsciously become familiar with them.

The numerical notations upon the various pieces are so disposed thereon that when the cards are positioned with the key numbers uppermost, notations upon the pieces will be so disposed as to be readily readable by the pupils, that is, in no instance will they be inverted. Obviously, if the numbers of the several combinations are to be subtracted, one from the other to produce the key number, the former will be connected by means of a "minus" sign, and if the numbers of the combinations are to be multiplied, or divided, the appropriate signs indicating multiplication or division will be employed.

An important feature of the invention contemplates the provision of a container for the parts of the apparatus already described and the use upon the container of graphic display matter such as a picture which is designed to attract the attention of a child and to develop his interest in the operation of assembling the various pieces and thereby to cause him unconsciously to become familiar with the notations thereupon. Preferably a picture and a rhyme may be associated together for this purpose. In the present instance the container consists of a shallow cardboard box having a body portion 11 and a cover 12. Upon the outside of the cover 12 is printed, or otherwise displayed, the rhyme of Humpty Dumpty, as shown at 13, together with a pictorial version 14 thereof. This particular picture and rhyme suggests the operations to be performed by the player of the game, i. e., it suggests the "putting together of Humpty Dumpty." This display matter is placed within view of the players and will serve to attract and sustain the interest of the child to the extent of causing him to repeatedly play the game or put together the pieces until he unconsciously memorizes or becomes familiar with the combinations of numbers To enable the players to verify the accuracy of the apparatus or to determine, by the notation upon any one of the pieces, with which card that particular piece should be associated, a table or chart is provided. The chart 15 indicates, in graded sequence, all the various combinations of two numbers from 1 to 9, inclusive, together with the numbers obtained by adding together with the numbers of these combinations. It will thus be seen that both the body 11 and cover 12 of the container are component parts of the apparatus and are indispensable to the attainment of the desired results from the playing of the game.

To add a further element of interest to the game, a series of members 16 have been provided which are shaped to represent caps and are adapted to be placed upon the upper portions of the egg-shaped cards. Each of the members or caps 16 bears a key numeral of a different card, and the use of the caps assists in impressing upon the mind of the player the key numeral with which he is concerned at any particular time.

As hereinbefore stated, it is to be understood that the invention is not limited to use for giving instruction in numbers, and that the matter, both entertaining and instructive, displayed upon the various parts of the apparatus may be variously changed within the scope of the claims. For example, various nursery rhymes, other than the one referred to, may be printed and pictorially represented upon the container, the cards may be cut out to represent parts of the picture or features associated therewith and smaller pieces may be cut from the cards, these pieces having educational matter printed thereon and being adapted to be placed by the player in their original relative positions.

Instead of numbers, the educational matter displayed upon the pieces of apparatus may, for example, consist of words. In such a case, a different word will be prominently displayed upon each card of the set and a different synonym will be printed upon each of the various pieces into which each card is cut. Thus, in putting together the several pieces, the various synonyms for the word upon the card will be associated together and unconsciously impressed upon the mind of the player.

It is to be distinctly understood that while the nursery rhyme and illustration of Humpty Dumpty has been herein employed for illustrative purposes, various rhymes accompanied by appropriate pictures may be used which will tend to influence the child to assemble together the pieces constituting the game or device or which are in some way or other suggestive of such assembling operation or closely related therewith.

What is claimed is:

1. A device for use in teaching arithmetic to children comprising a card having a notation of numerical value prominently displayed thereon, a plurality of pieces for assembly with said card each piece bearing a different notation of said value, and a picture separate from said card and bearing also graphic display matter said picture and said display matter being designed to cooperate to attract the attention of the child and to develop his interest in the operation of assembling said pieces.

2. A device for use in teaching arithmetic to children comprising a card having a notation of numerical value prominently displayed thereon, a picture separate from said card, a plurality of pieces for assembly with said card each piece bearing a different notation of said value, said card bearing also a picture designed to cooperate with the first mentioned picture to attract the attention of the child and to develop his interest in the operation of assembling said pieces.

3. A device for use in teaching arithmetic to children comprising a card having a notation of numerical value prominently displayed thereon, and a plurality of pieces for assembly with said card each piece bearing a different notation of said value, a container for said card and pieces, said card bearing also a picture and said container bearing a rhyme of a character which in conjunction with said card is calculated to arouse the interest of the child and to influence him to attempt the assembly of said pieces with said card.

4. A device for use in teaching arithmetic to children comprising a card having a notation of numerical value prominently displayed thereon, a plurality of pieces for assembly with said card each piece bearing a different notation of said value, a container for said card and pieces bearing a picture and a rhyme, said card having means for determining the assembled relation of said pieces therewith and also bearing graphic display matter of a nature suggestive when taken in connection with said picture and rhyme of the assembly of said pieces and card.

5. A device for use in teaching arithmetic to children comprising a card having a numeral prominently displayed thereon, a plurality of pieces for assembly with said card each piece bearing a different combination of numerals the sum of which equals the numeral displayed upon said card, said card bearing also graphic display matter designed to attract the attention of the child and to develop his interest in the operation of assembling said pieces and means independent of said card and cooperating therewith for further attracting the attention of the child.

6. An educational apparatus comprising a series of cards each bearing a different numeral and having a plurality of openings of similar shapes therein, a plurality of sets of pieces shaped to fit said openings, the number of the openings in each card and of the pieces in each set being determined by the number of combinations of two numerals the sum of which is equal to the numeral borne by said card, each of said pieces having displayed thereon a different numerical notation, the notations on the pieces of the several sets being indicative of the value of the numeral borne by the respective card, and a picture independent of said cards designed to attract the attention of the child and develop his interest in the operation of assembling said pieces.

7. An educational apparatus comprising a series of cards each having a picture and a different numeral prominently displayed thereon, a plurality of sets of pieces adapted for assembly with said cards, the pieces of each set bearing different combinations of numbers indicative of the same numerical value and the sums of the numbers upon the pieces of the several sets corresponding to the numerals borne by said cards, and a container for said cards and pieces bearing graphic display matter designed to attract the attention of the child and develop his interest in assembling said pieces with said cards, said cards being shaped to graphically represent an article represented by said display matter.

8. An educational apparatus comprising a series of cards each having a picture and a different numeral prominently displayed thereon, a plurality of sets of pieces adapted for assembly with said cards, the pieces of each set bearing different combinations of numbers indicative of the same numerical value and the sums of the numbers upon the pieces of the several sets corresponding to the numerals borne by said cards, a container for said cards and pieces bearing graphic display matter designed to attract the attention of the child and develop his interest in assembling said pieces with said cards, and a table showing all of said numerals and in connection with each numeral, the various combinations borne by said pieces which are indicative of the values designated by said numeral, said cards being shaped to graphically represent something suggested by said display matter.

9. An educational apparatus comprising a series of egg-shaped cards each having a plurality of apertures of similar outline therein and a different numeral displayed thereon, a plurality of sets of pieces for assembly with each card, the pieces being shaped to fit said openings, and the pieces of each set bearing different combinations of numerals indicative of the value of the numeral upon the respective card, and a picture separate from said cards and symbolically illustrative of the assembly of said pieces within said apertures.

In testimony whereof I have affixed my signature.

MILDRED L. WARREN.